(No Model.)
G. S. FORSCHNER.
PAN FOR WEIGHING SCALES.
No. 561,704. Patented June 9, 1896.
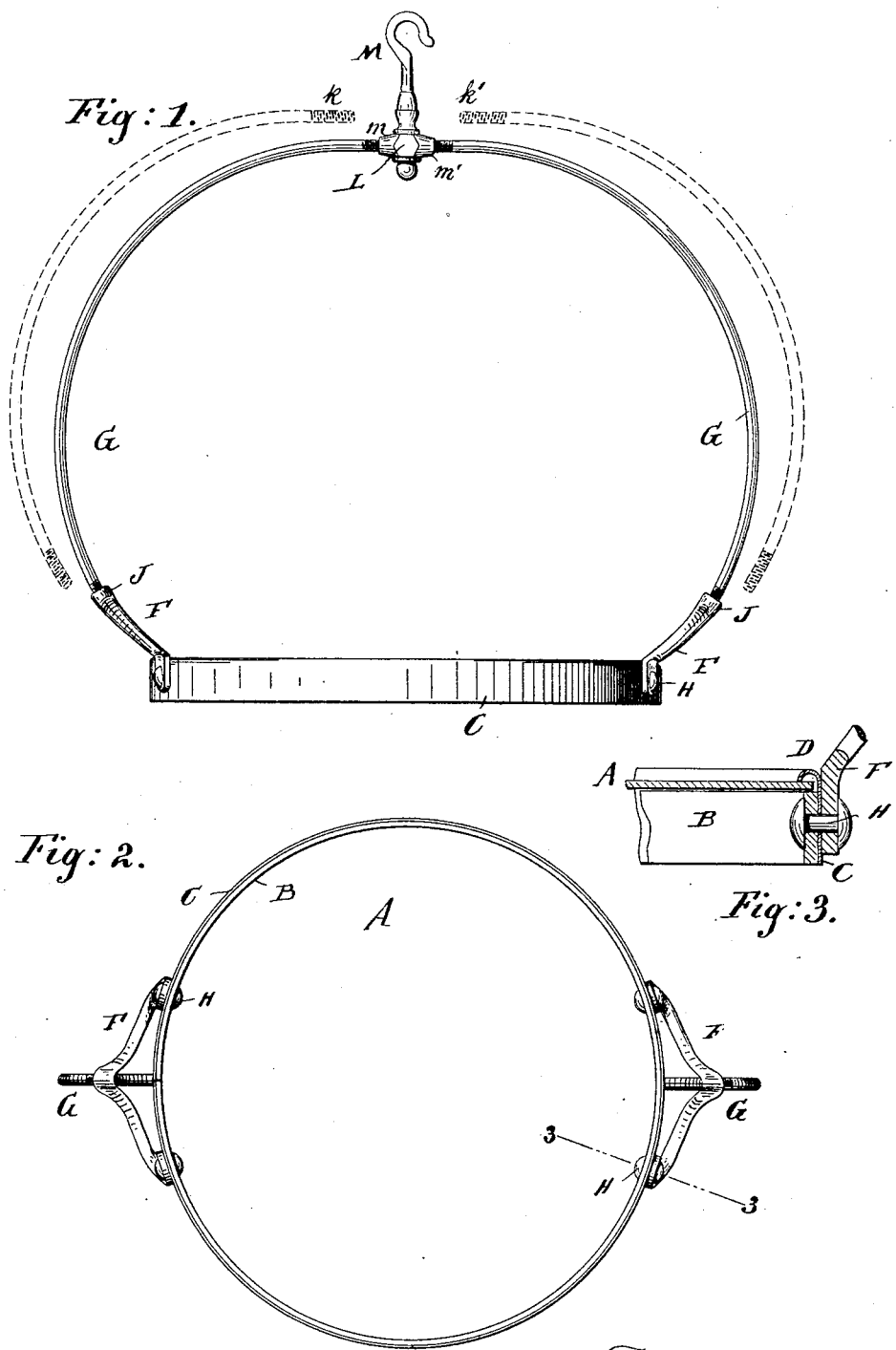

UNITED STATES PATENT OFFICE.

GEORGE S. FORSCHNER, OF NEW YORK, N. Y.

PAN FOR WEIGHING-SCALES.

SPECIFICATION forming part of Letters Patent No. 561,704, dated June 9, 1896.

Application filed May 23, 1895. Serial No. 550,344. (No model.)

*To all whom it may concern:*

Be it known that I, GEORGE S. FORSCHNER, a citizen of the United States, and a resident of the city of New York, in the county of New York and State of New York, have invented certain new and useful Improvements in Pans for Weighing-Scales, of which the following is a specification.

This invention relates to improvements in pans for weighing-scales; and the object of my invention is to provide new and improved weighing-scales in which the pan is simple in construction, strong and durable, and not apt to be broken or damaged while handling and using it; and a further object of my invention is to provide pans for weighing-scales so constructed that they can be taken apart and folded very compactly for storage and shipping, so as to occupy very little space and not so apt to be bent or otherwise damaged in transportation and which scale-pans can readily be put together for use by the purchaser without the use of tools and without requiring the services of a skilled mechanic.

The invention consists in the construction and combination of parts and details, as will be fully described and set forth hereinafter, and finally pointed out in the claim.

In the accompanying drawings, forming a part of this specification, and in which like letters of reference indicate like parts in all the views, Figure 1 is a side view of my improved scale-pan and its hanger. Fig. 2 is a plan view of the under side of the pan. Fig. 3 is an enlarged vertical detail sectional view through the rim part of the scale-pan on the line 3 3 of Fig. 2.

The pan A is made of enameled sheet metal or other suitable material and is not provided with a downwardly-projecting flange, as has been customary heretofore, but has a plain circular edge. A metal ring B, made endless or of a piece of flat metal bent in circular shape, is placed against the under side of the pan along the rim, and said ring B is surrounded by a ring C of sheet metal, such as brass or German silver, the upper edge of which extends beyond the top of the pan and is worked over on the upper surface of the pan to form a hollow flange or bead D, the free edge of which rests snugly on the upper surface of the pan, as shown in Fig. 3. Two yokes F must be provided at diametrically opposite points on the pan, to which yokes the lower ends of the suspending or hanging bows G are to be fastened. The ends of the shanks of said yokes are provided with holes, and through the same and suitable holes in the rings B and C rivets H are passed, which thus serve for holding the rings B and C together and also serve for holding the yokes F on the rim of the pan. As the ring B is thus firmly held in place, and the bead or hollow flange D of the ring C rests on the top of the pan proper, A, said pan proper is securely held in place on the top of the inner ring B. Said inner ring stiffens and braces the pan proper and permits of making the same of lighter material and also protects the pan from being injured and damaged by blows, &c., against the rim of the same, and the exterior ring C gives the pan a handsome finish.

The yokes F are provided at their upper parts with screw-sockets J for receiving the lower threaded ends of the bow-sections G, of which one is provided at the upper end with a right screw-thread $k$ and the other with a left-hand screw-thread $k'$.

The cross-piece L is provided at one end with a right-hand-threaded screw-socket $m$ for receiving the right-threaded end $k$ of one bow-section G, and the opposite end of the cross-piece is provided with the left-hand-screw-threaded socket $m'$ for receiving the left-hand-threaded end $k'$ of the other bow-section G. A suspension-hook M is swiveled in the usual manner in the cross-piece L for suspending the pan from the spring-balance proper.

The yokes F remain permanently attached to the pan; but the bow-sections G are unscrewed from the yokes F and the cross-piece L, as indicated in dotted lines in Fig. 1, and are placed upon the pan and packed for shipment or storage, and thus occupy very little space and are not apt to be bent, broken, or otherwise damaged by and during transportation.

The purchaser or user of the scales screws the lower ends of the two bow-sections G into the threaded sockets J in the upper ends of the yokes F and brings the upper ends of the two bow-sections G as nearly opposite each other as possible, without, however, bending or straining said sections. The cross-piece L is brought between the upper ends of the bow-sections G, and the upper end of the bow-section having the left-hand-threaded end $k'$ is passed into the socket for receiving it, a turn or partial turn is given to said cross-piece, and then the upper end of the other bow-section is placed into the other socket in the cross-piece and the cross-piece is turned on its longitudinal axis, whereby the upper ends of both bow-sections are screwed firmly into the ends of the cross-piece, and the pan is ready for use.

To take the parts of the suspending device apart, it is only necessary to reverse the above-described operations.

By dispensing with the flange on the pan and not directly connecting the suspending device with the pan the pan is not subjected to the strain exerted by the yokes under the action of a load and the enamel is less apt to crack and chip.

Having thus described my invention, what I claim as new, and desire to secure by Letters Patent, is—

The combination with a scale-pan, of a metal ring resting against the bottom of the same along the edge, a second metal ring surrounding the first-mentioned ring and having a top inward flange resting on the upper surface of the pan, yokes resting against the outer ring and rivets passed through the ends of the yokes and through the two metal rings, for the purpose of holding the yokes on the rings and also holding the two rings together and thereby holding the pan securely between the top edge of the inner ring and the under side of the flange of the outer ring, substantially as herein shown and described.

In testimony that I claim the foregoing as my invention I have signed my name, in presence of two witnesses, this 21st day of May, 1895.

GEORGE S. FORSCHNER.

Witnesses:
  OSCAR F. GUNZ,
  H. M. FLANNERY.